Feb. 10, 1970 W. L. DEEG 3,495,218

DATA TRANSMITTING SYSTEM UTILIZING SHIFT REGISTERS AND LINE RELAYS

Filed June 19, 1967 2 Sheets-Sheet 1

FIG I

INVENTOR:

WYMAN L. DEEG

By Mason, Kolehmainen, Rathburn & Wyss

INVENTOR
WYMAN L. DEEG

By Mason, Kolehmainen, Rathburn & Wyss

United States Patent Office 3,495,218

Patented Feb. 10, 1970

3,495,218
DATA TRANSMITTING SYSTEM UTILIZING SHIFT REGISTERS AND LINE RELAYS

Wyman L. Deeg, Glenview, Ill., assignor to C. P. Clare & Company, Chicago, Ill., a corporation of Delaware Filed June 19, 1967, Ser. No. 647,117
Int. Cl. H04q
U.S. Cl. 340—147 14 Claims

ABSTRACT OF THE DISCLOSURE

A system for bidirectional signaling over a channel using identical stations each having a plural stage, reed switch shift register with an input stage and an output stage. A transmitting relay at each station driven by a pulse source and controlled by the bit stored in the output stage periodically breaks the channel to pulse line relays at all of the stations. The line relays each include a make set of contacts and a break set of contacts, one of which controls signals reception and bit storage in the input stage and the other of which shifts data along the register. A transmit-receive control normally renders both sets of contacts effective in the receiving station and is operated to a transmit mode in the transmitting station to start the pulse source and disable the signal receiving circuit controlled by one set of the line relay contacts. Signaling can be either bipolar or pulse width modulated.

This invention relates to a signaling system and, more particularly, to a signaling system including new and improved data transmitting and receiving circuits using a common shift register.

The increasing use of systems for automatically collecting and relaying data in such different fields as process control, inventory control, telemetry, and retail sales has intensified the need for low cost and reliable units for transmitting and receiving data. Although many different types of equipment are now available for performing these common functions, a substantial portion of these are designed to achieve high speed transmission and reception and frequently include rather elaborate error checking facilities. The size, complexity, and cost of these systems frequently preclude their use in the many applications in which lower speed transmission is acceptable and a low cost of the equipment is of primary importance.

Accordingly, one object of the present invention is to provide a comparatively inexpensive data transmitting and receiving system operable at low and intermediate bit rates.

A further object is to provide a signaling system using a shift register at each station for controlling the reception and transmission of data.

A further object is to provide a shift register at each station for controlling the reception and transmission of data.

A further object is to provide a signaling system using bipolar or pulse width modulating techniques that requires a minimum of data storage and control components.

A further object is to provide a signaling system including a new and improved arrangement for using a shift register to control data transmission.

Another object is to provide a signaling system including a new and improved arrangement for receiving and storing data in a shift register.

In accordance with these and many other objects, an embodiment of the invention comprises a signaling system consisting of at least two identical stations connected by a signaling channel. Each of the stations includes a shift register having an input stage to which received bits are supplied, an output stage for controlling the transmission of data over the channels, and a shift circuit or conductor for shifting bits from the input stage toward the output stage. A line relay coupled to the signaling channel at each of the stations includes two pairs of contacts, one of which is connected to the shift circuit or conductor and the other of which controls an input signal circuit connected to the input stage of the shift register.

To condition the system for transmission from one station to the other station, a transmit-receive control is operated to a transmit setting in which a transmitting unit of the station is rendered effective and the input signal circuit extending to the input stage is disabled. The transmitting unit includes a transmitting relay connected to the signaling channel to control the operation of the line relays at both of the stations and a pulse source for driving and synchronizing the transmitting operations. A pair of control contacts in the output stage of the shift register at the transmitting station controls the transmitting unit and the transmitting relay to apply distinctive signals to the signal channel, either signals of different duration or of different polarities in dependence on the mark or space or "0" or "1" significance of the bits stored in the output stage. Since the transmit-receive control in the receiving station remains in its normal receive position in which the input signal circuit is effective, the transmitting relay at the transmitting station operates the line relays at both of the stations to effect the synchronized shifting of data bits toward the output stage in the transmitting station and the reception or detection of bits at the receiving station which are stored in the input stage and shifted toward the output stage.

The equipment providing the stations of the system requires a minimum number of components in utilizing the same shift register, line relay, and other components for both transmitting and receiving operations. The number of components required to perform the transmitting and receiving functions are easy to maintain and substantially reduced in number so that the signaling system of the present invention can be used in an extended number of applications.

Many other objects and advantages of the present invention will become apparent from considering the following detailed description in conjunction with the drawings in which.

The signaling system embodying the present invention, as indicated above, requires a minimum number of components to perform the desired data transmitting and receiving functions. In addition, the components of this system use sealed magnetic reed or mercury switches to provide a system which can be used in adverse environments with a greatly extedned operating life and which can be serviced and maintained without requiring highly skilled personnel or expensive test equipment. Further, these components can be packaged on printed circuit boards to be capable of installations in the same racks or the same type of racks as provided for, for instance, the data collecting or utilizing circuits with which the signaling system may be associated.

Figure 3:
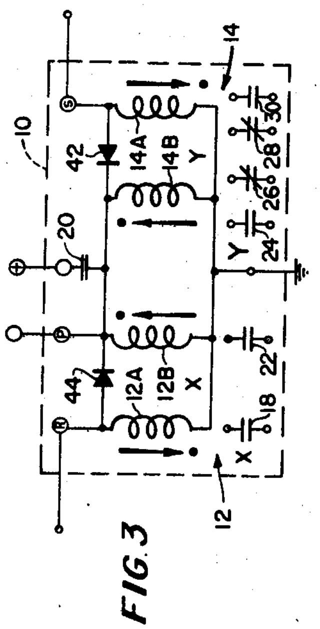
FIG. 3 is a schematic diagram of a bistable circuit forming a component of the signaling systems.

Referring now more specifically to FIGURE 3 of the drawings, therein is illustrated a bistable circuit 10 which is used as a control component and as a stage of the shift registers in the signaling system. The bistable circuit 10 is illustrated in FIG. 5 of United States Patent No. 3,244,-942, and the operation of this circuit is set forth in detail in this patent.

In general, the bistable circuit 10 includes a first or X winding means 12 and a second or Y means 14. The X winding means 12 controls the selective operation of an X group of sealed magnetic switches 18, 20, and 22, and the Y winding means 14 controls the operation of a Y group of sealed magnetic switches 24, 26, 28, and 30. The switch units 18, 20, 22, 25, 26, 28, and 30 can be of any of the well known "wet" or "dry" contact types. When a magnetic flux field of a given magnitude or unit strength of either polarity is applied to the switches, the switches are operated to complete an electrically conductive circuit. The switch can be maintained in a closed circuit condition by the application of a magnetic field of either polarity having a strength on the order of one-half of that required to operate the switch.

In the normal condition of the bistable circuit 10, the three sealed switches 18, 20, and 22 forming the X group of contacts or switches are in an open condition. In the Y group of sealed switch units including the units 24, 26, 28, and 30, a permanent biasing magnet is disposed immediately adjacent the switch units 26 and 28 and is of a sufficient strength to operate these switches. Thus, as is illustrated in the schematic diagram in FIG. 3, the switch units 24 and 30 are in an open condition and the switch units 26 and 28 are in a closed condition in the normal reset condition of the bistable circuit 10.

The X winding means 12 includes a pair of coils 12A and 12B which, when energized, provide magnetic fields of approximately equal unit strength and opposite polarity. The winding 14 includes a pair of coils 14A and 14B which, when energized, provide magnetic flux fields of substantially equal unit strength and opposite polarity. The polarity of the field generated by the coil 14B is opposite to the polarity of the field provided by the biasing magnet, and the polarity of the field generated by the coil 14A is the same as that provided by the biasing magnet.

One terminal of each of the coils 12A, 12B, 14A, and 14B is connected to a source of reference potential, such as ground, and the remaining terminal of the coil 14A is connected to a set or input terminal S. This set terminal is connected through a coupling diode 42 to the remaining terminals of the coils 12B and 14B. The other terminal of the coil 12A is connected to a reset terminal R, and this terminal is also connected through a coupling diode 44 to one terminal of the coil 12B and one terminal of the coil 14B. The normally open contacts 30 in the X group are connected between a source of latching potential and the terminals of the coils 12B and 14B. The remaining normally open switches 18 and 22 in the X group and the normally open Y group contacts 24 and 30 and the normally closed Y contacts 26 and 28, as shown schematically in FIG. 3, are used for control or output functions. If desired, additional contacts can be added to either of the X or Y groups in accordance with circuit requirements.

When the bistable circuit 10 is to be operated from its normal reset condition to an operated or a set condition, a positive-going input signal or pulse is applied to the set terminal S. This signal directly energizes the coil 14A in the Y winding 14, and the coil 14B is energized through the diode 42 so that substantially equal and oppositely directed or balanced flux fields are generated in the Y group of contacts by the winding means 14. Since the biasing magnet holds the switches 26 and 28 closed, all four of the illustrated Y group contacts remain in a normal condition. However, the coil 12B in the X winding 12 is also energized through the diode 42 to generate an unbalanced flux of sufficient strength to operate or close the contacts 18, 20, and 22. When the contacts 20 are closed, a positive potential from the latching supply is forwarded through the closed contacts 20 to maintain the energized condition of the coils 12B and 14B. The latching supply potential is of the same polarity and magnitude as the input supplied to the set terminal S.

When the input signal is removed from the set terminal S, the coils 12B and 14B remain energized through the operataed switch 20, and the coil 14A is no longer energized. This shifts the flux supplied to the magnetic elements in the sealed switches or contacts 24, 26, 28, and 30 from a balanced condition to an unbalanced condition in which the flux field provided by the coil 14B closes the contacts 24 and 30 and opposes that of the biasing magnet to open the switches 26 and 28. The bistable circuit 10 remains in this condition with the X and Y groups of contacts actuated until such time as the bistable circuit 10 is reset by applying a positive-going signal to the reset terminal R or by disconnecting the latching potential from the closed contacts 20.

When the bistable circuit 10 is to be reset or returned to its normal condition, a positive-going signal is applied to the reset terminal R so that the coil 12A in the X winding 12 is directly energized, and the coils 12B and 14B are energized through the diode 44. Since both of the coils 12A and 12B in the X winding means 12 are energized, a balanced flux field consisting of equal fields of opposite polarities is applied to the magnetic elements of the contacts 18, 20, and 22. This restores these contacts to a normal open condition and disconnects the latching potentials from the coils 12B and 14B. Since only the coil 14B in the winding means 14 is energized by the input signal, the Y group of contacts remains operative. However, when the input signal is removed, the X winding means 12 and the Y winding means 14 are not energized, and the contacts 24, 26, 28, and 30 in the Y group are restored to their normal condition. The bistable circuit 10 can also be reset by momentarily removing the latching potential to release all of the X and Y contacts. When the latching potential is reapplied, the contacts 20 are open, and the bistable circuit is not returned to a set condition.

The bistable circuit 10 also includes prime or direct input terminal P. This terminal is connected directly to the terminals of the coils 12B and 14B in the X and Y winding means 12 and 14. When a positive-going pulse is applied to the terminal P, both of the coils 12B and 14B are energized so that all of the X and Y contacts in the bistable circuit are actuated. Operation of the contacts 20 connects the coils 12B and 14B to the latching potential to hold the bistable circuit 10 in a set condition when the prime signal is removed from the terminal P.

Figure 1:
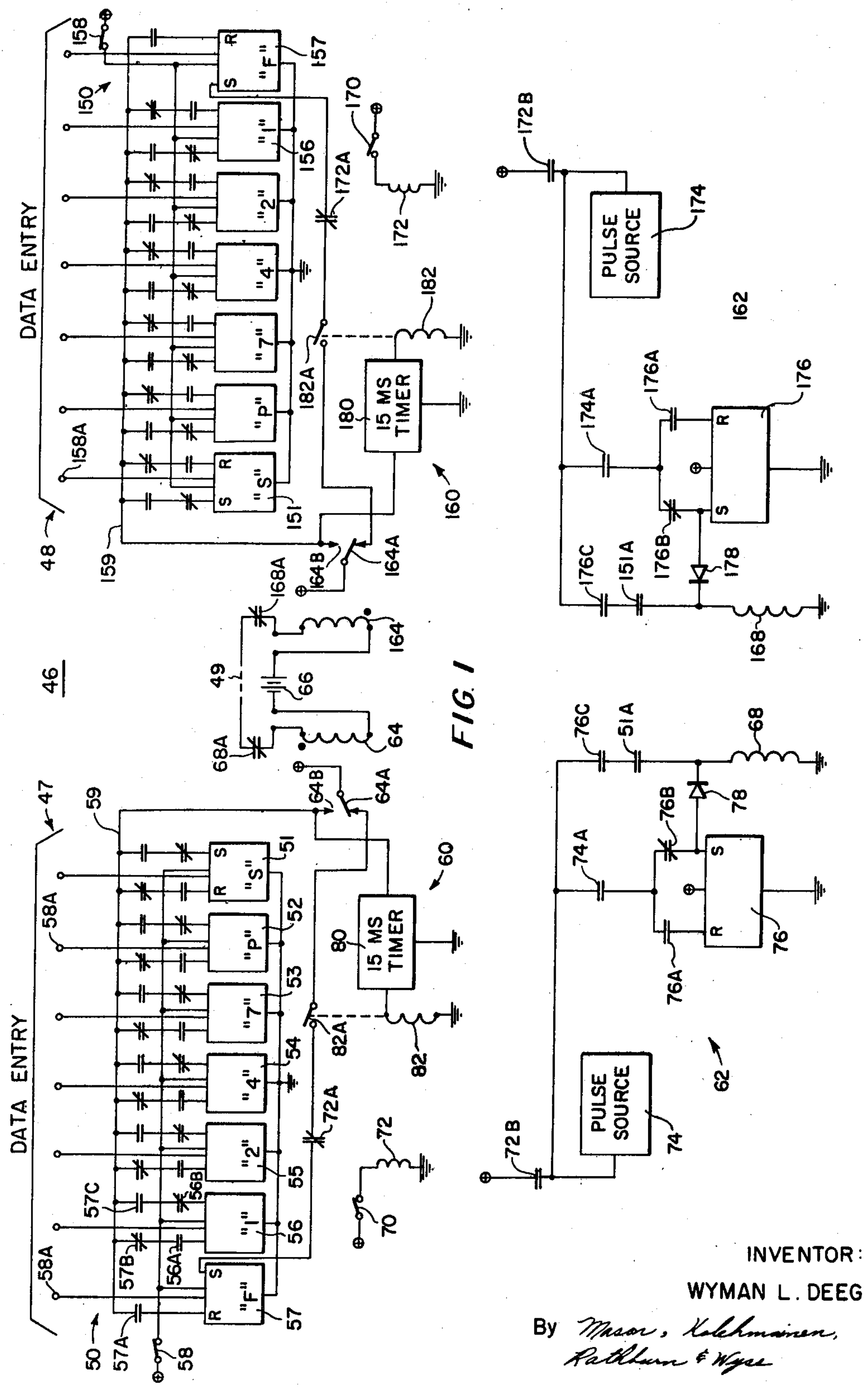
FIG. 1 is a schematic circuit diagram of a first signaling system embodying the present invention.

Referring now more specifically to FIG. 1 of the drawings, therein is illustrated a signaling system 46 which embodies the present invention and which includes two identical stations 47 and 48 connected over a signaling channel 49. The system 46 is arranged to provide pulse width modulated transmission of intelligence between the stations 47 and 48 over the channel 49.

The station 47 includes a shift register 50 which stores received information from the station 48 supplied by an input signal circuit indicated generally as 60 and stores data to be transmitted to the station 48 by a transmitting unit or means indicated generally as 62. The other station 48 includes components identical to the station 47 and designated by the same reference number with a prefix digit "1." In other words, the shift register in the station 48 is designated as "150."

The shift register 50 is substantially identical to the shift register shown in FIG. 6 of United States Patent No. 3,244,942 and operates substantially in the manner described therein. The illustrated shift register 50 includes seven stages 51–57 which, when a complete data item is provided, store a start bit, a parity bit, bits representing the binary weights "7," "4," "2," and "1" and a finish bit, respectively. Thus, the stages 51–57 are adapted to store a single binary coded decimal digit in combination with start, finish, and parity information, and the shift register 50 can include as many additional stages as necessary in accordance with the number of data items in the data word or message to be transmitted. The shift register stage 57 provides an input stage in which data bits received from the channel 49 are stored by the input signal circuit 60, and the stage 51 provides an output stage including contacts for controlling the transmission of data stored in the shift register 50 by the transmitting means 62. The individual stages 51–57 comprise bistable modules 10 of the type shown in FIG. 3, all of which are connected to a source of latching potential through a normally closed switch 58, the operation of which clears the shift register 50 to its normal condition in which all of the stages 51–57 are in a reset condition.

To provide means for storing a data item to be transmitted in the shift register 50, each of the prime terminals P of the bistable circuits 10 forming the stages 51–57 is connected to a data input or entry terminal 58A. A complete data entry for the illustrated single digit register includes start and finish bits, correct binary coding for the decimal digit to be transmitted, and a parity bit in dependence upon whether the system is set for odd or even parity. In the illustrated system, it is assumed that the presence of an input signal on one of the terminals 58A represents the presence of the bit, such as a start or finish bit, or with respect to the stages 52–56, a binary "1." Thus, the bistable circuits forming the stages 51–57 are set to represent the presence of a bit or a binary "1" and remain in a reset condition to represent the absence of a bit or binary "0."

The selective actuations of the X and Y group contacts of the bistable circuits 10 forming the stages 51–57 are used to control the selective shifting of data along the shift register 50 in a direction from the input stage 57 to the output stage 51 in the manner described in the above-identified patent. A normally open Y group contact 51A from the output stage 51 forms a part of the transmitting means 62.

As an example and as set forth in detail in the above-identified patent, the storage of a bit in the input stage 57 representing the finish bit causes the operation of the Y group contacts so that, for example, two pairs of normally open contacts 57A and 57C are closed and a pair of normally closed contacts 57B are opened. The closure of the contacts 57A connects the reset terminal of the stage 57 to a shift signal circuit or conductor 59. Thus, when a shift signal is supplied to the conductor 59, the input stage 57 is reset. The closure of the contacts 57C and the opening of the contacts 57B prepares the circuit for coupling the shift conductor 59 to the next highest stage 56 in the shift register 50. The contacts 57B are connected in series to a pair of normally open contacts 56A from the Y group of contacts in the stage 56, and the normally open contacts 57C are connected in series with a pair of normally closed contacts 56B in the Y group of contacts in the stage 56. Since the storage of a bit in the stage 57 opens the contacts 57B and closes the contacts 57C, the shift pulse on the conductor 59 that resets the stage 57 is routed over the closed contacts 57C and 56B to set the stage 56, thus shifting the finish bit from the stage 57 to the stage 56.

In the event that the stage 56 was in a set condition representing the storage of a bit or binary "1" in this stage, the contacts 56B would have been opened when the shift pulse was applied to the conductor 59. However, the opening of the contacts 57B prevents the application of the shift pulse to the reset terminal of the stage 56, and the stage 56 will remain in its "1" representing condition at the termination of the shift pulse, the "1" condition now representing the presence of a finish bit rather than a bit of the binary weight "1." In this manner, the successive shift pulses applied to the conductor 59 shift the data entry from the input stage 57 toward the output stage 51 during both transmitting and receiving operations.

The application of shift pulses to the conductor 59 is controlled by a line relay having a winding 64 and two pairs of contacts 64A and 64B controlled thereby. The winding 64 of the line relay at the station 47 and the winding 164 of the corresponding line relay at the station 48 are connected in series over the signaling channel 49 with a potential source 66, a pair of normally closed contacts 68A on a transmitting relay having a winding 68 in the transmitting means 62 at the station 47 and a pair of normally closed contacts 168A on a corresponding transmitting relay whose winding 168 forms a part of the transmitting means 162 at the station 48. Thus, the windings 64 and 164 of the line relays are normally energized so that the contacts 64A and 164A are normally closed and the contacts 64B and 164B are open. Each time that the signaling channel 49 is interrupted by the opening of either of the contacts 68A and 168A, the line relays release to close the contacts 64B and 164B and apply a positive shift signal to the shift circuits or conductors 59 and 159 at both of the stations 47 and 48.

Assuming that decimal digit "6" is to be transmitted from the station 47 to the station 48 using an even parity check, a positive input signal is applied to the input terminals 58A connected to the bistable circuits 10 forming the shift register stages 51, 54, 55, and 57 so that these stages are set, the remaining stages 52, 53, and 56 remaining in a reset condition. The operation of these stages prepares circuits for shifting the stored bits toward the output stage 51 under the control of signals applied to the shift conductor 59 in the manner described above. Further, the storage of a start bit in the stage 51 sets this bistable circuit so that the Y group of contacts are operated including the pair of normally open contacts 51A in the transmitter 62. As set forth above, the system 46 is adapted to transmit intelligence using pulse width modulation and, in the system used to illustrate the invention, the presence of a bit or binary "1" is represented by an open circuit condition on the channel 49 having a 20 ms. duration, and the absence of a bit or a binary "0" is represented by an open circuit condition of 10 ms. duration.

To condition the station 46 for transmitting operations, a transmit-receive control is operated to a transmit setting by closing a switch 70 to energize a winding 72 of a control relay. The energization of the winding 72 opens a pair of normally closed contacts 72A connected to the input stage 57 to prevent the storage of data in the shift register 50 during the transmitting operation. The energization of the winding 72 also closes a pair of normally open contacts 72B to render the transmitting means 62 effective.

More specifically, the closure of the contacts 72B energizes a pulse source 74 and places the pulse source in operation. The pulse source 74 can be of any suitable well-known construction, such as that shown in United States Patent No. 3,209,175. With the arbitrarily chosen values of a 10 ms. signal to represent a binary "0" and a 20 ms. duration signal to represent a binary "1," indicated above, the pulse source 74 is adjusted to close a pair of output contacts 74A for a 10 ms. period and to open these contacts for a following 10 ms. period, thereby supplying at the contacts 74A a 10 ms. positive-going pulse followed by a 10 ms. off period. The stream of positive-going pulses provided at the output contacts 74A is used to control the setting of a bistable circuit 76 that is identical to the bistable circuit 10 shown in FIG. 3. The bistable circuit 76 includes, in the Y group of contacts, a pair of normally open contacts 76A and a pair of normally closed contacts 76B. The contacts 76A are connected between the contacts 74A and the reset terminal of the bistable circuit, while the normally closed contacts 76B are connected between the contacts 74A and the set terminal of the bistable circuit 68, the contacts 76B also being coupled through an isolating diode 78 to one terminal of the winding 68 of the transmitting relay.

Accordingly, when the contacts 74A are first closed to forward a positive potential through the closed contacts 76B, the set terminal of the bistable circuit 76 is energized to operate the X group of contacts, the Y group of contacts remaining in their normal condition. This positive-going pulse is also forwarded through the diode 78 to energize the winding 68 so that the contacts 68A are opened. The opening of the contacts 68A interrupts the continuity of the signaling channel 49 so that the windings 64 and 164 are no longer energized. This releases the line relay in the transmitting station 47 so that the contacts 64B are closed and the contacts 64A are opened. The closure of the contacts 64B applies a positive-going shift pulse to the shift pulse conductor 59 to selectively energize the set and reset terminals of the stages 51–57 of the shift register 50 in the transmitting station 47. The leading edge of this shift pulse operates or releases the X groups of contacts in the shift register stages but does not change the state of the Y group of contacts in the stages 51–57.

The opening of the contacts 68A also terminates the energization of the winding 164 for the line relay at the receiving station 48 so that the contacts 164A are opened and the contacts 164B are closed. The closure of the contacts 164B applies a positive shift signal to the shift conductor 159 which does not perform any useful function. Similarly, the opening of the contacts 164A does not perform a useful function. The closure of the contacts 164B does, however, initiate the bit receiving or detecting operation of the input signal circuit 160 in the receiving station 148.

More specifically, the closure of the contacts 164B energizes a timing circuit 180 which is set to discriminate between "0" representing pulses of 10 ms. duration and "1" representing pulses of a 20 ms. duration. More specifically, the timing circuit 180 is set to energize a winding 182 of a relay at the end of a 15 ms. period so that a pair of contacts 182A controlled by the winding 182 are closed. Accordingly, the contacts 182A are closed only if the interruption in the signaling channel 49 persists for more than 15 ms. i.e., is not a binary "0."

At the end of the 10 ms. on period of the pulse source 74, the contacts 74A are opened. As set forth above, when the positive potential is removed from the set terminal of the bistable circuit 76, the X group of contacts are held in their actuated condition in which they were placed at the beginning of the positive pulse, and the Y contacts are operated. In operating the Y group of contacts, the bistable circuit 76 opens the closed contacts 76B to disconnect the pulse output contacts 74A from the set terminal of the circuit 76 and closes the contacts 76A so that the contacts 74A are connected to the reset terminal of the bistable circuit 76. The opening of the contacts 76B and 74A interrupts the above-described circuit extending through the diode 78 for energizing the winding 68.

This termination of the pulse from the source 74 at the end of a 10 ms. period causes the release of the line relay by terminating the energization of the winding 68 when the signal applied to the signaling channel 49 is to represent the absence of a data bit or a binary "0." If, on the other hand, the presence of a data bit or a binary "1" is to be transmitted, the winding 68 of the line relay is selectively maintained energized under the control of the output stage 51 of the shift register 50 to provide the 20 ms. duration signal.

More specifically, when the first pulse from the source 74 is applied to the set terminal of the bistable circuit 76 in the manner described above, the X group of contacts in the bistable circuit 76 is immediately operated so that a pair of contacts 76C are closed. These contacts are connected in series with the contacts 51A of the output stage 51 between the closed contacts 72B and the winding 68. Since a start bit is stored in the output stage 51, the bistable circuit forming this stage is set and the contacts 51A are closed. Accordingly, the closure of the contacts 76C completes a holding circuit for the winding 68 extending the positive potential through the closed contacts 61A, 76C, and 72B. Therefore, when a "1" is to be transmitted and when the positive pulse from the pulse source 74 terminates and the contacts 76B are opened, the winding 68 of the line relay of the transmitting station 47 remains energized, and the signaling channel 49 remains in its open or mark condition.

Approximately 5 ms. following the termination of the positive pulse from the pulse source 74, the timer 180 in the receiving station 48 times out and energizes the winding 182 to close the contacts 182A, thus signifying that the duration of the signal has been greater than 10 ms. and is a signal representing the presence of a data bit or a binary "1."

The signaling system remains in this state until the 10 ms. off period of the pulse source 74 has expired and the contacts 74A are again closed. The contacts 74A complete a circuit extending through the contacts 72B and 76A for energizing the reset terminal of the bistable circuit 76. As set forth in the description of the bistable circuit 10, the energization of the reset terminal immediately releases the X group of contacts while maintaining the Y group of contacts energized. Thus, the X contacts 76C are opened to interrupt the holding circuit for the winding 68 of the transmitting relay so that the contacts 68A are closed. This restores the continuity of the channel 49 by returning it to a space condition and re-energizes the windings 64 and 164 of the two line relays at the stations 47 and 48. The energization of the winding 64 of the line relay in the transmitting station 47 opens the contacts 64B and closes the contacts 64A. The closure of the contacts 64A does not produce any useful function. The opening of the contacts 64B, however, terminates the positive shift pulse applied to the conductor 69 and, thus, causes the operation of the Y groups of contacts in the stages 51–57 of the shift register so that the shifting of the bits between the stages 51–57 and toward the output stage 51 is completed. Since, in the illustrative example set forth above, a bit is not stored in the parity stage 52, the Y group contacts in the output stage 51 are opened, and the contacts 51A of the transmitting unit 62 are opened to interrupt a second point in the holding circuit for the winding 68 of the transmitting relay.

The energization of the winding 164 of the line relay at the receiving station 48 opens the contacts 164B and closes the contacts 164A. The opening of the contacts 164B terminates the shift pulse applied to the shift conductor 159 and terminates the energization of the timer 180 and, thus, the energization of the winding 182. The relay controlled by the winding 182 is slow-to-release and, thus, retains the contacts 182A in a closed condition following the release of the timer 180. Accordingly, the closure of the contacts 164A completes a circuit extending through the closed contacts 182*a* and 172*a* to apply a positive potential to the set terminal of the input stage 157 of the shift register 150 in the receiving station 48. After the delay interval of the relay controlled by the winding 182, the contacts 182A are opened to complete the storage of a bit in the input stage 157 representing the start bit transmitted from the transmitting station 47.

The signaling system 46 remains in the status described above during the remainder of the 10 ms. on period of the pulse source 74 in which the reset terminal of the bistable circuit 76 is energized. At the end of this period, the contacts 74A are again opened by the pulse source 74, and the removal of the positive potential from the reset terminal of the bistable circuit 76 releases the Y group of contacts so that the contacts 76A are opened and the contacts 76B are closed. Thus, a path is prepared controlled by the pulsing contact 74A for energizing the set terminal of the bistable circuit 76 and the winding 68 of the transmitting relay during the next cycle of operation of the pulse source 74. Accordingly, at the end of the 10 ms. off period of the pulse source, the contacts 74A are closed for the third time since the initiation of the transmission of data from the station 47 to the station 48. The positive potential provided by the closed contacts 74A energizes the set terminal of the bistable circuit 76 and energizes the winding 68 of the transmitting relay so that the contacts 68A are again opened. The opening of the contacts 68A interrupts the continuity of the signaling channel 49 and terminates the energization of the windings 64 and 164 of the line relays at the two stations 47 and 48 to terminate the 10 ms. closed circuit condition providing a space separating the first transmitted bit from the second bit to be transmitted. The release of the line relay in the receiving station 48 again closes the contacts 164B and opens the contacts 164A so that the timer 180 is placed in operation and a shift pulse is applied to the shift pulse conductor 159. The release of the line relay in the transmitting station 47 again closes the contacts 64B to apply a positive shift signal to the shift pulse conductor 59 and initiates the shifting of the data one step further toward the output stage 51.

Since a "0" is stored in the output stage 51 and the contacts 51A are not closed, the winding 68 of the transmitting relay is de-energized at the end of the 10 ms. pulse provided by the pulse source 74. The removal of energization from the set terminal of the bistable circuit 76 also completes the operation of the Y group contacts by closing the contacts 76A and opening the contacts 76B to prepare a circuit for applying the next pulse from the source 74 to the reset terminal of the bistable circuit 76. The termination of the energization of the winding 68 releases the transmitting relay to close the contacts 68A so that the line relays controlled by the relays 64 and 164 are again operated.

The opening of the contacts 64B in the transmitting station 47 completes the shifting of the stored bits toward the output stage 51. The release of the line relay at the receiving station 48 opens the contacts 164B to complete the shifting of the start bit from the stage 157 to the stage 156 and terminates the energization of the timer 180. Since the open circuit condition on the signaling channel 49 has persisted for only 10 ms., the timer 180 has not timed out and the winding 182 has not been energized to close the contacts 182A. Accordingly, the closure of the contacts 164A does not complete a circuit for supplying a bit to the set terminal of the input stage 157, and this bistable circuit remains in a reset condition representing the parity bit "0" transmitted from the station 47.

The remainder of the items of information stored in the shift register 50 are transmitted to and stored in the shift register 150 at the receiving station 48 in the manner described above. When the transmission of information has been completed, the transmitting operation of the station 47 is terminated by returning this station to its normal or receive mode by opening the switch 70. Although the transmit-receive control including the switch 70 and the relay controlled by the winding 72 are illustrated as comprising manually actuated controls, this has been done to simplify the illustration of the invention, and there are many well known circuits for automatically initiating and terminating the transmitting operation as under the control of the completion of storage of data in the shift register 50 and the termination of the transmission of the stored information. Further, although the description above describes the transmission of data from the station 47 to the station 48, data can be transmitted from the station 48 to the station 47 merely by storing data in the shift register 150 and closing the switch 170.

Figure 2:
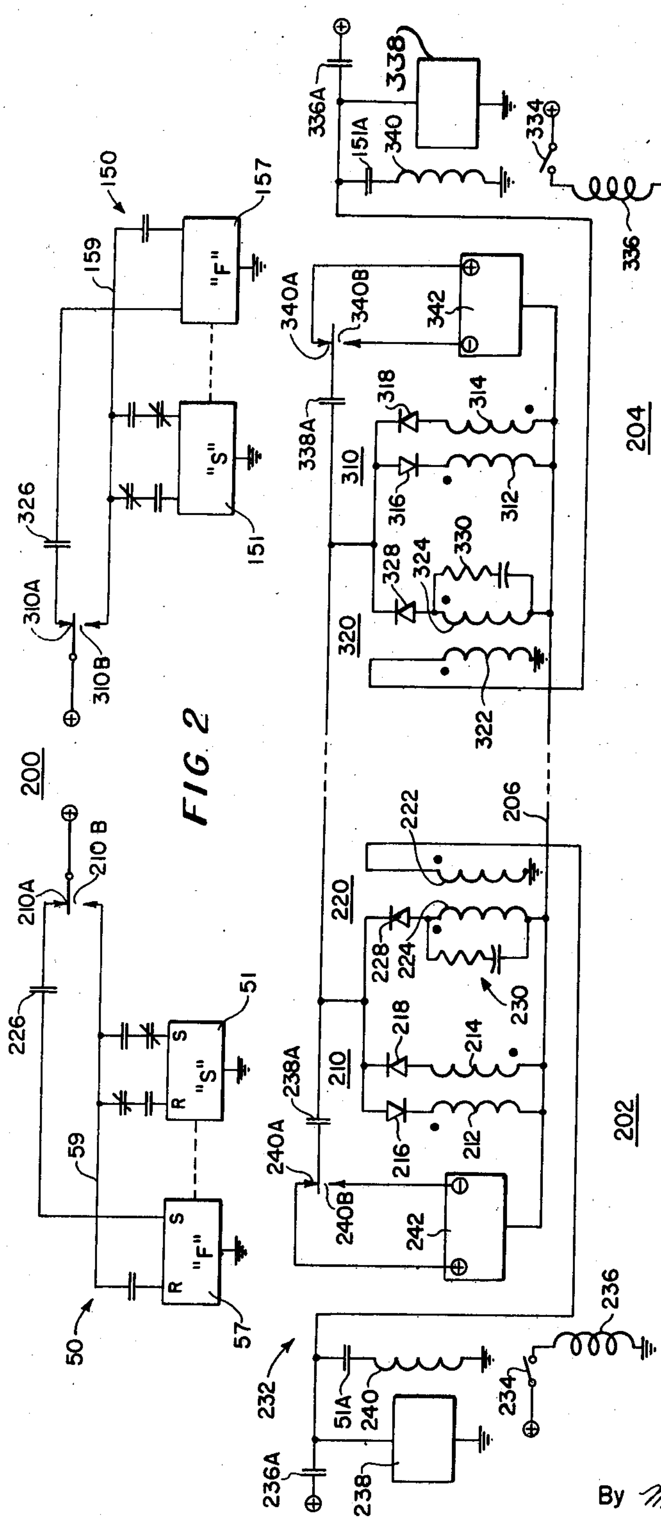
FIG. 2 is a schematic circuit diagram of a signaling system forming a second embodiment of the present invention.

FIG. 2 of the drawings illustrates a signaling system 200 for carying out data transmission between a pair of stations 202 and 204 over a signaling channel or link 206 using bipolar transmission in which negative signals represent the presence of data bits or a binary "1" and positive signals represent the absence of data bits or a binary "0." The stations 202 and 204 include the shift registers 50 and 150, respectively, used in the signaling system 46. The shift registers 50 and 150 are shown in fragmentary form in FIG. 2 as including only the input stages 57, 157 and the output stages 51, 151. In addition, the shift registers 150 and 50 include means such as those illustrated in FIG. 1 for supplying entries to be transmitted.

The station 202 includes a line relay 210 including a pair of windings 212 and 214 bridged across the signaling channel 206 through a pair of diodes 216 and 218, respectively. The relay 210 comprises a single-side-stable mercury switch having a pair of normally closed contacts 210A and a pair of normally open contacts 210B. The flux field produced by energizing either of the windings 212 or 214 opens the contacts 210A and closes the contacts 210B even though the winding 212 is energized when positive signals are applied to the line or channel 206 and the winding 214 is energized when negative signals are applied to the signal channel 206. The station 202 also includes a control relay 220 for controlling the reception of data bits from the channel 206. The relay 220 is a single-side-stable mercury switch including a pair of windings 222 and 224 and a pair of contacts 226. The energization of the winding 222 holds the contacts 226 in an open condition which is the state to which these contacts are magnetically biased. The winding 224 is connected across the signaling channel 206 through a diode 228 and is shunted by a slow-to-release circuit 230. The field produced by the energization of the winding 224 when a negative potential is applied to the channel 206 opposes the bias supplied to the contacts 226 and closes these contacts, the flux field produced by the winding 224 being prolonged following the removal of energization by the network 230 to render the relay 220 slow-to-release.

The components provided at the station 204 are identical to those provided at the station 202 and are identified by the same reference number with the prefix digit "2" identifying the component at the station 202 replaced by a prefix digit "3." Thus, the line relay 210 in the station 202 is designated as 310 in the station 204.

Assuming that data is to be transmitted from the station 202 to the station 204 over the signaling channel 206, the shift registers 50 and 150 are cleared and the data item to be transmitted is stored in the shift register 50. A transmitting means indicated generally as 232 in the station 202 is rendered effective by closing a transmit-receive control switch 234 to energize a winding 236 of a control relay. The energization of the winding 236 closes a pair of normally open contacts 236A. The closure of the contacts 236A energizes the winding 222 of the control relay 220 in a manner aiding the magnetic bias supplied to the contacts 226 so that these contacts are retained in an open condition regardless of the potential applied to the signaling channel 206. The closure of the contacts 236A also places a pulse source 238 in operation.

The pulse source can be the same as the pulse source 74 in the system 46 and includes a pair of normally open contacts 238A which are closed for 10 ms. followed by a 10 ms. open period. The contacts 238A selectively connect positive or negative potential to the signaling channel 206 in dependence on the state of a transmitting relay having a winding 240 controlling a pair of normally closed contacts 240A and a pair of normally open contacts 240B. The contacts 240A are connected to the positive terminal of a potential source or supply 242, and the contacts 240B are connected to a negative terminal of the power or potential source 242. If a data bit or a binary "1" is stored in the output stage 51 so that the contacts 51A are closed, the relay 240 is energized to close the contacts 240B and to open the contacts 240A. Thus, when the contacts 238A are closed by the pulse source 238, a negative potential is applied to the signaling channel 201 representing a binary "1." Alternatively, if a data bit or a binary "0" is stored in the output stage 51, the contacts 51A remain open and the relay 240 is not operated. Thus, when the pulse source 238 closes the contacts 238A, a positive potential is applied to the signal channel 206 representing the absence of a data bit or a binary "0."

In the illustrative example used in the description of the operations of the system 46, a start bit is always stored in the start bit or output stage 51 of the shift register 50. Accordingly, the contacts 51A are closed when the transmitter is placed in operation by the closure of the switch 234, and the relay 240 is operated when the contacts 236A are closed, thereby closing the contacts 240B and opening the contacts 240A. Thus, when the pulse source 238 first closes the contacts 238A, a negative potential is applied to the signaling channel 206. In the transmitting station 202, this negative potential is effective through the diode 218 to energize the winding 214 of the line relay 210. The energization of the winding 214 opens the contacts 210A and closes the contacts 210B to apply a positive signal to the shift conductor 59. The negative potential applied to the channel 206 is also forwarded through the diode 228 to energize the winding 224. Since the winding 222 is energized to aid the bias supplied to the contacts 226, the flux field resulting from the energization of the winding 224 is not effective to alter the state of the normally open contacts 226, and data is not fed into the input stage 57 of the shift register 50 in the transmitting station 202.

With regard to the receiving station 204, the negative potential applied to the signal channel 206 is forwarded through the diode 318 to energize the winding 314. The energization of the winding 314 opens the contacts 310A and closes the contacts 310B to apply a positive potential to the shift conductor 159. This, however, is without useful function at this time. The negative potential applied to the channel 206 is also forwarded through the diode 328 to energize the winding 324 of the control relay 320. The energization of the winding 324 closes the contacts 326.

At the end of the 10 ms. on period of the pulse source 238, the contacts 238A are opened to remove the negative potential from the signaling channel 206. This terminates the energization of the winding 314 so that the contacts 310A are closed and the contacts 310B are opened. The closure of the contacts 310A forwards a positive potential through the closed contacts 326 to the input of the input stage 157 in the shift register 150 and stores the start bit in the stage 157. After the slow-to-release interval of the control relay 320, this relay releases to open the contacts 326 and terminate the input signal supplied to the input stage 157. In the transmitting station 202, the opening of the contacts 238A terminates the energization of the winding 224 without effect and also terminates the energization of the winding 214 so that the contacts 210A are again closed and the contacts 210B are opened. The opening of the contacts 210B completes the shifting of the bits stored in the shift register 50 one step toward the output stage 51. Since, in the illustrative example set forth above, a binary "0" is the second data item to be transmitted, the stage 51 is in a reset condition and the contacts 51A are opened. Thus, the winding 240 is no longer energized, and the contacts 240A are closed and the contacts 240B are open.

When the pulse source 238 next closes the contacts 238A, a positive potential representing a binary "0" is applied to the signaling channel 206, and this does not affect the control relays 220 and 320 in the stations 202 and 204, respectively. The positive potential provided at the closed contacts 240A is forwarded through the diode 216 to energize the winding 212 so that the contacts 210A and 210B are again operated. The closure of the contacts 210B supplies a positive shift signal to the shift conductor 59. The positive potential applied to the channel 206 is also forwarded through the diode 312 at the receiving station 204 to energize the winding 312 of the line relay 310 and open the contacts 310A and close the contacts 310B. The closure of the contacts 310B applies a positive shift signal to the shift conductor 159.

At the end of the 10 ms. on period, the contacts 238A are opened to release the line relays 210 and 310 in the stations 202 and 204. The opening of the contacts 210B at the transmitting station 202 completes the shifting of the third data item to be transmitted into the output stage 51. The opening of the contacts 310B in the receiving station 204 completes the shifting of the "1" previously stored in the input stage 157 to the adjacent stage 156. Since the contacts 326 are still in an open condition when the contacts 310A are closed because the control relay 320 at the receiving station 204 was not operated, the input stage 157 is not set and represents the receipt of a binary "0." In this manner, the information stored in the shift register 50 at the transmitting station 202 is transmitted to the receiving station 204 over the signaling channel 206 using a bipolar signaling technique. The system 200 is restored to its normal condition by opening the switch 234 to release the transmit-receive relay controlled by the winding 236. Transmission from the station 204 to the station 202 is accomplished in the manner described above by operating the transmit-receive control switch 334 at the station 204.

Although the present invention has been described with reference to two illustrative embodiments thereof, it should be understood that numerous other modifications and embodiments of the present invention can be devised by those skilled in the art which will fall within the spirit and scope of the principles of this invention.

What is claimed and desired to be secured by Letters Patent of the United States is:

1. A bidirectional signaling system comprising:

first and second stations, a signaling channel connecting the first and second stations, a plural stage shift register at each of the first and second stations, each shift register including an input stage and an output stage, a shift signal circuit at each of the stations connected to the stages of the shift register for shifting data bits from the input stage toward the output stage, a line relay at each of the stations connected to the signaling channel and having two pairs of contacts, one of said pairs of contacts being connected to the shift signal circuit and the other pair of contacts being connected to the input signal circuit, a transmitting circuit at each of the stations connected to the signaling channel and operable to change the state of the channel to control the operation of the line relays at both of the stations, the transmitting circuit at each station being connected to and controlled by the output stage in the shaft register at the station and including a pulse source for operating the transmitting circuit, and a transmit-receive control at each station including means operated when the station is to transmit for placing the pulse source in operation and for inhibiting the operation of the input stage by the input signal source and including means operated when the station is to receive for inhibiting the generation of the pulse source and for coupling the input signal circuit to the input stage of the shift register.

2. A bidirectional signaling system comprising:

first and second stations, a signaling channel connecting the station, a plural stage shift register at each of the stations, each of the shift registers including an input stage, an output stage having a pair of output contacts, and a shift circuit coupling the stages for applying shift signals to the stages to shift data items from the input stage toward the output stage, a line relay at each of the stations connected to the signaling channel and including two pairs of contacts, means connecting the shift circuit at each station to one of the pairs of contacts on the line relay at the same station, transmitting means at each of the stations connected to the signaling channel and each including both a signal source and circuit means including the output contacts of the output stage in the shift register at the same station for controlling the application of signals to the signaling channel under the control of the signal source, the signals applied to the signaling channel by the transmitting means at either of the first and second stations controlling the operation of the line relays at both of the stations, an input signal circuit at each of the stations each including a circuit extending from the other pair of contacts on the line relay to the input stage of the shift register in the same station, and transmit-receive control means at each of the stations connected to the transmitting means and the input signal circuit at the same station, said transmit-receive control means normally being in a receive state and including both means for disabling the transmitter means and control contacts in the input signal circuit coupling said pair of contacts on the line relay to the input stage of the shift register, said transmit-receive control means also being operable to a transmit state to render the transmitting means effective and to hold said control contacts in the input signal circuit in an open condition.

3. The signaling system set forth in claim 2 including:

a control relay connected to the signaling channel at each of the stations and responsive to the polarity of the signals applied to the channel for selectively operating said control contacts in the transmit-receive control means, and an additional winding on the control relay connected to the transmit-receive control means for maintaining the control contacts open when the transmit-receive control means is in its transmit state.

4. The signaling system set forth in claim 2 in which the transmitting means at each station includes a relay controlled by the output contacts of the output stage of the shift register for selectively applying opposite polarity signals to the signaling channel.

5. The signaling system set forth in claim 2 in which the transmitting means at each station includes a relay controlled by the output contacts of the output stage of the shift register for applying signals of different duration to the signaling channel.

6. In a signaling system for transmitting and receiving signals representing code bits, a signaling channel, transmitting means coupled to the channel for applying a first signal to the channel representing the presence of a data bit and a second signal representing the absence of a data bit, a plural stage shift register having an input stage and a shift circuit for shifting data bits from the input stage to the other stages of the shift register, a line relay coupled to the signaling channel and operated by the first and second signals, said line relay having two pairs of contacts, first circuit means connecting one of the pairs of contacts on the line relay to the shift circuit to supply a shift signal to the shift register each time that the line relay is operated by the first and second signals, a bit receiving relay coupled to the signaling channel and operated by only one of the first and second signals received from the signaling channel, said bit receiving relay having a pair of normally open contacts and being slow-to-release at the end of the received signal, and an input circuit connected to the input of stage of the shift register for storing data bits in the shift register, said input circuit including the other pair of contacts on the line relay and the pair of contacts on the bit receiving relay.

7. The signaling system set forth in claim 6 in which:

the transmitting means includes means for providing first signals of one polarity and second signals of an opposite polarity, and the bit receiving relay comprising a polarity sensitive relay.

8. The signaling system set forth in claim 6 in which:

the transmitting means includes means for providing first signals of one duration and second signals of a different duration, and a timing circuit is connected to the bit receiving relay to operate the bit receiving relay only when the duration of the signal received from the channel is one of the two different durations.

9. A bidirectional signaling system comprising:

first and second stations, a signaling channel connecting the first and second station, a plural stage shift register in each of the stations, each of the registers having an input stage and an output stage, a shift signal conductor connected to the stages of each of the registers, an input signal conductor connected to the input stage of each register, a line relay at each of the stations connected to the signaling channel and having two pairs of contacts, one of the pairs of contacts being connected to the shift signal conductor and the other of the pair of contacts being connected to the input signal conductor, a transmitting relay at each of the stations and having a pair of contacts connected to the signaling channel for controlling the operation of the line relay at both of the stations, a transmitting circuit at each station controlled by the output stage of the shift register at the same station and connected to the transmitting relay at the same station for controlling the operation of the transmitting relay, and a transmit-receive control at each of the stations coupled to the transmitting circuit and the input signal conductor at the same stations for controlling the transmission and reception of signals.

10. The signaling system set forth in claim 9 including:

a timing circuit at each of the stations operated by contacts of the line relay, and means in said station controlled by the timing circuit to control the application of signals over the input signal conductor to the input stage of the register.

11. The signaling system set forth in claim 9 in which the transmitting circuit at each station includes:

a pulse source providing time spaced signals, a bistable circuit operated to alternate stable stations by the pulse sources, a circuit controlled by the bistable circuit and coupled to the transmitting relay for operating the transmitting relay for a given period of time when the bistable circuit is in only one of its alternate stations, and a holding circuit for said alternating relay controlled by the output stage for holding said transmitting relay operated for a period of time longer than said given period when a given bit of information is stored in the output stage 12. In a signaling system using pulses of two different durations or widths to represent alternate values of a data bit, a plural stage shift register bearing an output stage, said output stage having two alternate stages, one of which represents the value of one data bit and the other of which represents the value of the other data bit, means connected to the shift register to store the bits of a data item to be transmitted in the stages of the shift register, a signaling channel, a transmitter relay connected to the signaling channel an operable between two alternate states to place the channel in two different states, a bistable circuit operable between two stable states, a pulse source connected to the bistable circuit and providing a series of time spaced pulses for operating the bistable circuit between two stable states, an operating circuit connected to the transmitting relay and controlled by the bistable circuit to operate the relay when the bistable circuit is in one of its states and to release the relay when the bistable circuit is in its other stable state, a holding circuit connected to the transmitting relay and controlled by the output stage of the shift register only when the bistable circuit is in a predetermined one of its stable states for varying the time that the transmitting relay is operated and released in dependence on the state of the output stage, and shifting means operated in synchronism with the operation and release of the transmitting relay for shifting the data bits stored in the shift register toward the output stage.

13. The signaling system set forth in claim 12 in which the bistable circuit includes a pair of contacts in the operating circuit connected in series between the pulse source and the transmitting relay.

14. The signaling system set forth in claim 12 in which the bistable circuit and the output stage each include a pair of contacts connected in series in the holding circuit.

References Cited

UNITED STATES PATENTS

| | | | |
|---|---|---|---|
| 3,261,913 | 7/1966 | Reichert | 340—167 XR |
| 3,356,991 | 12/1967 | Wehr | 340—147 |

DONALD J. YUSKO, Primary Examiner

U.S. Cl. X.R.

340—167, 168